US005315644A

United States Patent [19]

Lester et al.

[11] Patent Number: 5,315,644

[45] Date of Patent: May 24, 1994

[54] TELEPHONE INTERFACE CIRCUIT

[75] Inventors: James W. Lester, Ventura; Randall M. Wagner, Thousand Oaks; Randy A. Callaway, Simi Valley, all of Calif.

[73] Assignee: Harris Corporation, Melbourne, Fla.

[21] Appl. No.: 795,373

[22] Filed: Nov. 21, 1991

[51] Int. Cl.[5] .............. H04M 11/00

[52] U.S. Cl. .............. 379/103; 379/102; 379/399; 379/393; 379/105; 379/377

[58] Field of Search .............. 379/102, 103, 104, 105, 379/170, 377, 399, 393, 162, 163

[56] References Cited

U.S. PATENT DOCUMENTS

| | | | |
|---|---|---|---|
| 3,978,468 | 8/1976 | Bond et al. | 379/103 |
| 4,538,031 | 8/1985 | Beming et al. | 379/103 |
| 4,731,821 | 3/1988 | Jackson, III | 379/103 X |
| 4,788,714 | 11/1988 | Hasimoto | 379/102 X |
| 4,821,312 | 4/1989 | Horton et al. | 379/102 |
| 4,893,331 | 1/1990 | Horiuchi et al. | 379/102 X |
| 5,113,432 | 5/1992 | Van Stantbrink et al. | 379/102 X |

FOREIGN PATENT DOCUMENTS

| | | | |
|---|---|---|---|
| 2367389 | 5/1978 | France | 379/103 |

*Primary Examiner*—James L. Dwyer
*Assistant Examiner*—M. Shehata
*Attorney, Agent, or Firm*—Evenson, McKeown, Edwards & Lenahan

[57] ABSTRACT

A circuit for interfacing a host telephone system having a trunk line pair with a central office line pair and an additional circuit line pair includes a loop current monitor circuit for monitoring the host telephone system trunk line pair which is normally connected to the central office line pair. The loop current monitor provides a status signal output indicating the presence or absence of loop current. A relay controller receives the status signal and provides a relay control signal and a hold signal. A relay selectively connects the host telephone system trunk line pair to the additional circuit line pair in response to the relay control signal when loop current is detected after the host telephone goes off-hook. A hold termination circuit receives the hold signal and traps any loop current signals which may be detectable over the central office line pair. The relay controller circuit is active to generate the relay control signal only for an initial time period after the host telephone system goes off-hook.

5 Claims, 1 Drawing Sheet

TELEPHONE INTERFACE CIRCUIT

FIELD OF THE INVENTION

This invention relates to a telephone interface circuit such as is found in a controller for operating a door/telephone system and, more particularly, to the interfacing of a host telephone system with a central office telephone line pair and an additional system line pair.

BACKGROUND OF THE INVENTION

The need to share a host telephone system between a central office line and an additional system line has existed for some time. This need is most prevalent when the host telephone system is used with a limited number of central office line ports or when in a residential environment being served by a single central office line. Sharing the central office line interface with the additional system avoids the increased costs associated with extra central office trunk interfaces or dedicated additional systems. The additional systems can be, for example, paging/intercom circuits having a paging/intercom line pair. However, while the description is given with respect to a paging/intercom additional circuit interfacing with the central office via a door phone controller, it is understood by those skilled in the art that other types of additional circuits may also be interfaced.

When using the host telephone system with a additional system, e.g. an electronic key telephone system (EKTS), the features of the additional system, such as paging/intercom, can be accessed in different manners. Typically, for a paging circuit using a dedicated line, the paging feature can be accessed via a central office trunk port or, in an EKTS system, via a page port. However, the page port is usually limited in performance. This is because the port provides only a one-way page audio path such that dual-tone multi-frequency (DTMF) (used for programming or zone paging) or talk-back (talk-back being audio generated at the speaker) is not passed. If either of these features, i.e. DTMF or talk-back is required, then the user must dedicate a central office trunk port for the exclusive purpose of performing paging.

One of the first attempts at sharing the interface allowed the host telephone to access either the paging system or the central office line by pressing a predetermined DTMF digit on the telephone keypad. If a central office telephone call arrived while the paging system was in use by the user, then a "call waiting tone" was returned to the host telephone. If a central office telephone call arrived while the host telephone was on-hook, then the call is passed through as if the paging device was not present. However, while this operation satisfied the requirements of sharing the central office line with a paging/intercom system, several disadvantages with respect to the user arise. For example, once the host telephone initially goes off-hook, the user receives a non-standard dial tone. After receiving this non-standard dial tone, the user must dial a certain digit, e.g. usually "9", to receive the central office dial tone. Alternatively, the user could wait a pre-programmed amount of time after going off-hook before receiving the central office dial tone.

An alternative operation for sharing the central office line with an additional system avoided some of the above-described disadvantages by immediately providing the user with a central office dial tone upon going off-hook. However, this solution created a further problem in that if the user desired access to the paging circuits when the telephone is connected to the central office line, the usual signals for switching between the central office line and additional systems, e.g. "hook flash" signals and all DTMF digits, would initially be sent to the central office switch. Therefore, the central office switch would function in accordance with the features available to it. This has the disadvantage of making the access to the paging circuits dependent upon the central office switch rather than the door phone controller.

There is therefore needed an interface provided in a door phone controller which allows the user to access the additional circuits upon taking the host telephone system off-hook.

SUMMARY OF THE INVENTION

This need is met by the telephone interface of the present invention which makes use of a loop current monitor circuit and a relay controller circuit. The invention operates in conjunction with a mode of operation in which the host telephone system is primarily connected to the central office line pair and can be switched to the additional circuitry such as the paging-/intercom circuits. In this mode, the user automatically receives the central office dial tone upon going off-hook. The loop current monitor circuit monitors the host telephone system's trunk line pair to determine whether the user has activated a "hook flash", thus indicating the desire to switch to the additional circuitry. For example, if the user presses the hook flash button on the host telephone, the loop current in the lines is interrupted and the loop current monitor circuit detects the absence of the current. The status of the loop current is signaled by the loop current monitor to the relay controller circuit. Simultaneously, the relay controller activates a hold termination circuit which prevents the central office line pair from receiving the "hook flash" signal.

The relay controller circuit, upon receiving a signal indicating the user's desire to switch to the additional circuitry, switches the host telephone system's trunk line pair to the additional circuitry, and then releases the hold termination circuit on the central office pair. Therefore, the central office does not see the hook flash sent by the host phone system.

The relay controller circuit only operates to switch the interface for an initial time period after the host telephone goes off-hook. Alternatively, if the loop current monitor circuit does not detect a user-generated signal in the predetermined time period after the host telephone system goes off-hook, for example, three or four seconds, then the relay controller operates the interface as a normal central office line connection and all signals, i.e. loss of loop current, are transmitted directly to the central office via the central office line pair.

The present invention has the advantage of providing central office dial tone to the user immediately after going off-hook. Further, the invention allows the user to access the additional circuitry without requiring the central office to interpret the user-generated signal to switch to the additional circuitry.

Other objects, advantages and novel features of the present invention will become apparent from the following detailed description of the invention when considered in conjunction with the accompanying drawings.

DETAILED DESCRIPTION OF THE DRAWING

Door Phone Controller Overview

Figure 1:
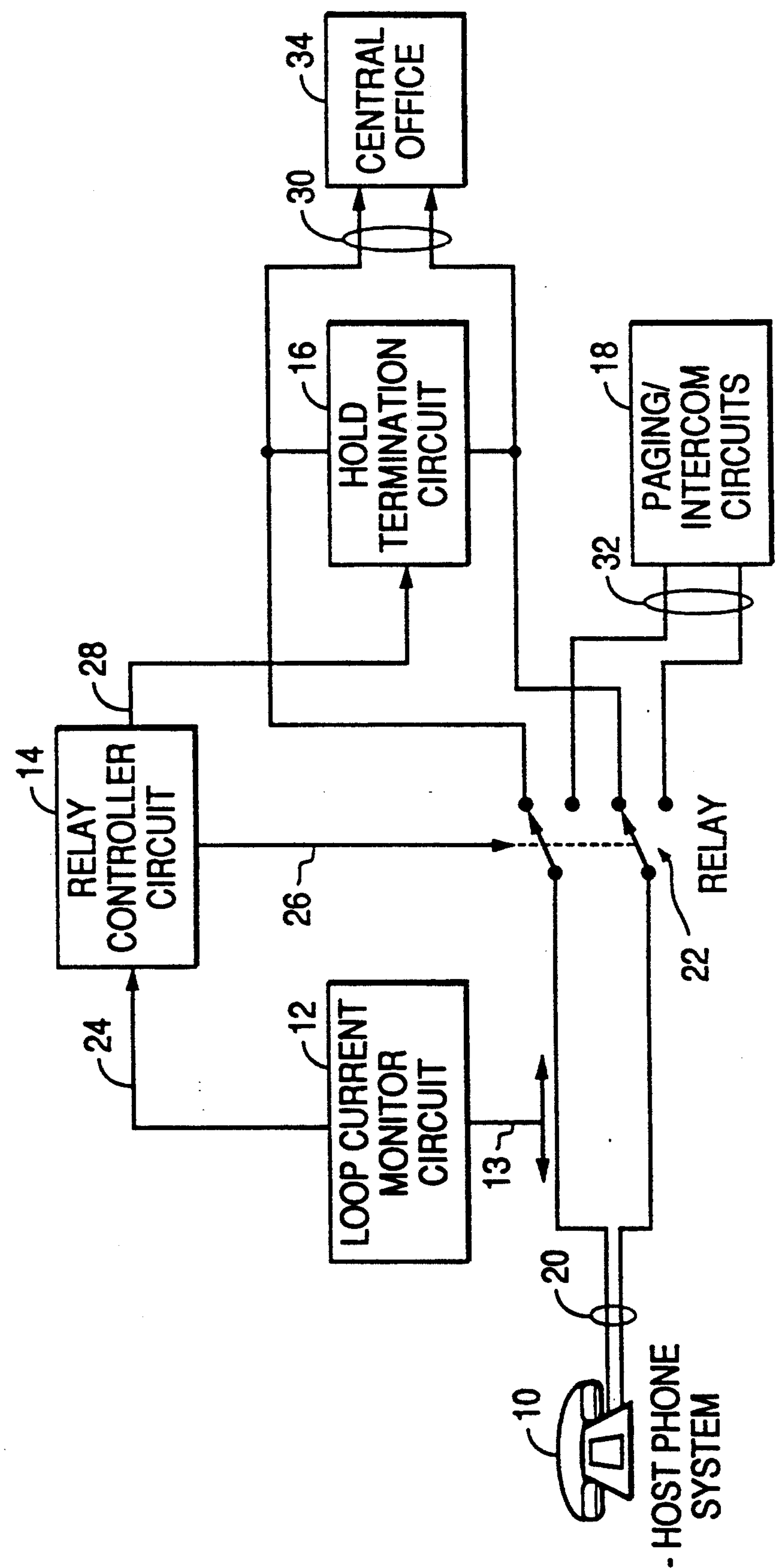
FIG. 1 is an overall schematic block diagram of the circuitry according to the present invention.

In order to fully understand the operation of the telephone interface circuit according to the present invention, a brief overview of the operation of the door phone controller performing a door answer operation will be provided for three separate modes of operation. These three modes of operation are labeled the dedicated mode, i.e. wherein the host trunk port is dedicated to the door answering function; the port saver mode which permits sharing of the host telephone system's trunk port between the additional circuitry and an outside central office line; and the trunk saver mode which utilizes the circuitry of the present invention and also permits the sharing of the host telephone system's trunk port between additional circuitry and an outside central office line.

Briefly, the door phone controller is used to allow individuals to gain access to a building or a portion of a building by communicating with another individual who controls the access point, such as a door. For example, with respect to an apartment building, a page/intercom system is generally provided at the entrance door to the apartment building. The page/intercom system allows a person desiring access to the building to speak with someone who can control that access. Typically, each of the residents of the building can control an electrical/mechanical door release for the entrance door through either a door-unlock push-button located in the apartment unit or via signals input into their telephone keypad. The individuals controlling access to the door communicate with the door speaker through their individual telephone sets. The operation of the page/intercom and door access circuitry is provided by the door phone controller.

In any of the three modes, i.e. dedicated mode, port saver mode or trunk saver mode, if the door speaker push-button is pressed by an individual attempting to gain access, the door phone controller generates a ring signal to the host telephone system to which it is directed. Also, electrical contacts which activate a customer-provided chime will be closed by the door phone controller. During this ringing operation, all subsequent door speaker push-button closures, i.e. activations, are ignored. Only a confirmation tone is received by the door speaker each time the door speaker push-button is pressed.

The cadence and duration of the ring signal is programmable. For example, the ring cadence may have a default setting of two seconds on and four seconds off, with a six-second cycle period. The ring duration can be programmed, for example, from 0 to 99 seconds with a default of 30 seconds. Programming the ring duration to be zero seconds effectively disables the ringer. The programmed ring duration establishes the maximum length of time that the door phone controller will generate ring cycles before it is reset to a idle condition. If the customer-provided chime is available, the chime contacts will open and close with the same cadence and duration as the ring signal.

When a person inside of the building hears the host telephone ringing and/or the chime sounding, the individual can respond by answering the ringing phone thus causing the host telephone to go off-hook and draw loop current from the door phone controller. Upon detecting a loop current flow, the door phone controller stops generating the ring signal and establishes a two-way, page/talk-back path with the door speaker. In order to open the door for the individual attempting to gain access, the person inside the building can either enter door code into his telephone keypad or pres the customer-provided door unlock push-button. Either of these actions can, for example, cause a closing of metallic contacts which control the electrical/mechanical door release. The activation period for unlocking the door can be programmed from, for example, 0 to 99 seconds with a default setting of 4 seconds.

Dedicated Mode

In the dedicated mode, the host trunk port attached to the door phone controller is not available to make or receive outside central office telephone calls. The trunk port is merely dedicated to the door answering function full-time. A silent monitor function can be provided in which the user makes a phone connection to the trunk port on which the door phone controller resides. This connects the user to the door speaker in a listen mode. No sounds or tones are sent to the door speaker at the time the connection is made. This allows the user to listen to any sound which the door speaker can receive. During the silent monitor function, the paging and door opening functions are active.

Port Saver Mode

The port saver mode of op®ration permits a sharing of the host telephone system's trunk port between the door phone controller and an outside line to a central office. Thus, the trunk port may perform its normal call functions as well as servicing the door. In the port saver mode of operation, the host telephone's trunk port is normally connected to the door functions and is switched by the door phone controller to the central office line in order to service outgoing or incoming telephone calls.

In order to make an outside telephone call in the port saver mode of operation, the call is made by establishing a phone connection to the trunk port on which the door phone controller resides. The door phone controller operates by returning a unique dial tone, for example, a 311Hz dial tone, to the telephone. After an initial period of time, for example on the order of 4 seconds, the door phone controller automatically connects the trunk port to the central office line. Alternatively, the user may activate a keypad digit, for example "9"on the host telephone, or send a "hook flash" signal. Either of these operations will immediately connect the trunk port to the central office line anytime during the initial time period after going off-hook. Once the trunk port is connected to the central office line, the central office dial tone will be received and an outside call can be placed accordingly. When the outside call is disconnected, the trunk port is automatically reconnected to the door functions.

In order to receive an outside call in the port saver mode of operation, the door phone controller operates by automatically switching the host trunk port to the central office line upon detecting an incoming call from the central office. Again, when the outside call is disconnected, the trunk port is automatically re-connected to the door functions.

If the door speaker push-button is activated, i.e. pressed by someone wanting access, followed by an incoming telephone call, the door phone controller operates by giving the incoming telephone call a higher priority. The host telephone system trunk port will be switched to the central office line to service the telephone call. If, however, the host telephone is already connected to the door speaker when the incoming telephone call occurs, the door phone controller operates to alert the user by sending a "call waiting" tone to the host telephone. The user can then respond to the "call waiting" tone by either finishing the conversation with the person at the door, open the door if he chooses, and then hang up, or the user can ask the person at the door to hold and press a "hook flash" or a DTMF digit to receive the incoming telephone call. When the user disconnects the incoming telephone call, the host trunk port is again reconnected to the door. Therefore, the user can then access the door if someone is still holding at the door.

When a telephone call is in progress and is interrupted by door activity, a door phone controller alerts the user by sending a "door alert" tone to the host telephone. The user can then either open the door without disrupting the telephone call by pressing the door-unlock push-button, or, the user can place the telephone call on hold by signaling a "hook flash" signal, and then switch to the door speaker in order to converse with the person at the building entrance. A further "hook flash" or DTMF signal will toggle the host telephone back to the person holding.

Trunk Saver Mode

The trunk saver mode of operation, similarly to the port saver mode, permits a sharing of the host telephone equipment's trunk port between the door and a central office line pair. While the trunk saver and port saver modes operate similarly, in the trunk saver mode, the host trunk port is normally connected to the central office line pair and is switched to the door phone controller when the door needs servicing. This differs from the port saver mode wherein the host trunk port is normally connected to the door and is switched to the central office line pair to service outside calls. The trunk saver mode has the advantages of eliminating the user inconveniences in attempting to service outside calls, i.e., having to wait a predetermined time or activate a keypad digit.

In the trunk saver mode of operation, if the door speaker push-button is pressed, the host trunk port is automatically switched from the central office line pair to the door functions. After the door has been serviced, the door phone controller switches the host trunk port back to the central office line pair. Because the host trunk port is normally connected to the central office line pair, outside telephone calls are made in the usual manner for host telephone equipment without inconveniencing the user. Similarly, incoming telephone calls are received in the usual manner for the host telephone equipment.

As with the port saver mode, if the door speaker push-button is pressed followed by an incoming call, the controller gives higher priority to the incoming telephone call.

If an outside telephone call is in progress and the door speaker push-button is pressed, the door phone controller alerts the user by sending a "door alert" tone to the host telephone. The user can open the door without disrupting the call by pressing the door-unlock push-button, or, the user can "hook flash" to the door speaker to converse with the person at the building entrance. The "hook flash" signal causes the door phone controller to put the central office telephone call on hold. Again, an additional "hook flash" or DTMF signal toggles back to the call in progress. When the user disconnects the telephone call the host trunk port is automatically re-connected to the central office line pair.

A silent monitor is also provided in the trunk saver mode of operation. However, because the host trunk port is normally connected to the central office which may have features that utilize the "hook flash" signal, the door phone controller allows compatibility by intercepting any "hook flash" signal sent to activate the silent monitor during an initial time period, for example 5 seconds, and using the intercepted "hook flash" signal to switch the trunk port to the door. After the initial time period, any "hook flash" is passed directly to the central office and ignored by the door phone controller unless a "door waiting" alert has been sent by the controller to the host telephone, i.e. for when an outside call is in progress and the door speaker push-button is activated. The present invention allows for the operation of a silent monitor in the trunk saver mode of operation as will be seen from FIG. 1 discussed below.

Telephone Interface Circuit

FIG. 1 is a circuit diagram of the telephone interface according to the present invention which forms portion of the door phone controller. This circuit is used to interface the host telephone system 10 between a central office 34 and additional circuitry such as paging/intercom circuits 18. A loop current monitor circuit 12 is provided for monitoring the presence or absence of loop current in the PBX trunk line pair 20 connecting to the individual telephone set in the host system 10. The loop current monitor circuit 12 provides a signal along line 24 indicative of the status of the trunk port line pair 20 to a relay controller circuit 14. The relay controller circuit 14 provides signals over line 26 to activate a relay switch 22. The relay switch 22 alternatively couples the trunk port line pair 20 to either the central office line pair 30 or the additional circuit line pair 32. The relay controller circuit 14 also provides a signal over line 28 to a hold termination circuit 16. The hold termination circuit 16 is shown coupled across the central office line pair 30. When activated, the hold termination circuit 16 traps all open loops in order to prevent the central office 34 from receiving open loop signals. The circuit of the present invention has its loop current monitor 12 coupled to the host trunk port as indicated generally at 13. If the host telephone equipment 10 goes off-hook in the trunk saver mode, the loop current is monitored by the loop current monitor 12 to detect the presence or absence of loop current indicating whether a "hook flash" has been sent. The loop current monitor 12 operates to indicate the presence or absence of loop current over line 24 to the relay controller circuit 14. The relay controller circuit 14 interprets the significance of either the presence or absence of the loop current based on the particular access mode and stage of a telephone call. For example, if a "hook flash" signal is generated within the initial time period after the host telephone goes off-hook, the relay controller detects the absence of loop current (generated by the "hook flash" signal) and activates the relay 22 via line 26 to switch the host trunk port line pair 20 to the additional circuitry line pair 32. Simultaneously, the relay controller circuit 14 provides a signal over line 28 to the hold termination circuit 16. The hold termination circuit 16 operates to trap any open loops that may be subsequently generated to prevent the central office 34 from detecting the generated signals.

During normal central office line monitoring, i.e. after the initial time period, all loss of loop current is transmitted directly to the central office 34 via line 30. The hold termination circuit 16 allows the central office 34 to be placed on hold.

In this manner the host telephone system 10 is advantageously primarily connected to the central office 34 and will thus immediately receive the central office dial tone upon going off-hook. However, if the user has gone off-hook in order to communicate with the door, he need only activate the "hook flash" signal for the relay controller circuit 14 to switch the host trunk port to the door circuits.

It will be understood by those skilled in the art that while the present invention was described primarily with respect to the interfacing of a central office line and a door answer system, other types of additional systems can be interfaced with the central office lines.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A circuit for interfacing a host telephone system having a trunk line pair with a central office line pair and an additional circuit line pair, comprising;

a loop current monitor circuit for monitoring the host telephone system trunk line pair normally connected to the central office line pair and providing a status signal output in response to a monitored condition;

a relay controller capable of receiving said status signal and providing a relay control signal and a hold signal;

a relay for selectively connecting the host telephone system trunk line pair to the additional circuit line pair in response to receiving the relay control signal;

a hold termination circuit which receives said hold signal and, in response, said hold termination circuit trapping any loop current signals detectable over the central office line pair; and wherein said relay controller circuit is active to generate said relay control signal for an initial time period after the host telephone system goes off-hook.

2. A circuit according to claim 1, wherein said loop current monitor circuit detects the presence or absence of loop current in response to signals generated by said host telephone system.

3. A circuit according to claim 2, wherein said relay is a double pole, double throw relay.

4. A method for interfacing a host telephone system having a host trunk line pair with a central office line pair and an additional circuit line pair, the method comprising the steps of;

a) coupling the host trunk line pair to the central office line pair under normal operation;

b) monitoring the host trunk line pair to detect presence or absence of loop current;

c) switching a relay to couple the host trunk line pair to the additional circuit line pair when the absence of loop current is detected;

operating a hold termination circuit in response to the absence of loop current to block any loop current signals from the central office line pair; and wherein the step of switching a relay is operable only during an initial time period after the host telephone system enters an off-hook condition.

5. A method according to claim 4, wherein the step of switching includes the steps of;

receiving in a relay controller circuit a loop current status signal from said monitoring step;

generating a relay switch signal to said relay when the absence of loop current is detected within the initial time period; and generating a hold termination signal simultaneously with said relay switch signal.

* * * * *